April 20, 1965 N. EVASCU ETAL 3,179,265
CHARGING MACHINES
Filed Feb. 2, 1962 3 Sheets-Sheet 1

INVENTORS
Nicholas Evascu &
Milo Shutt

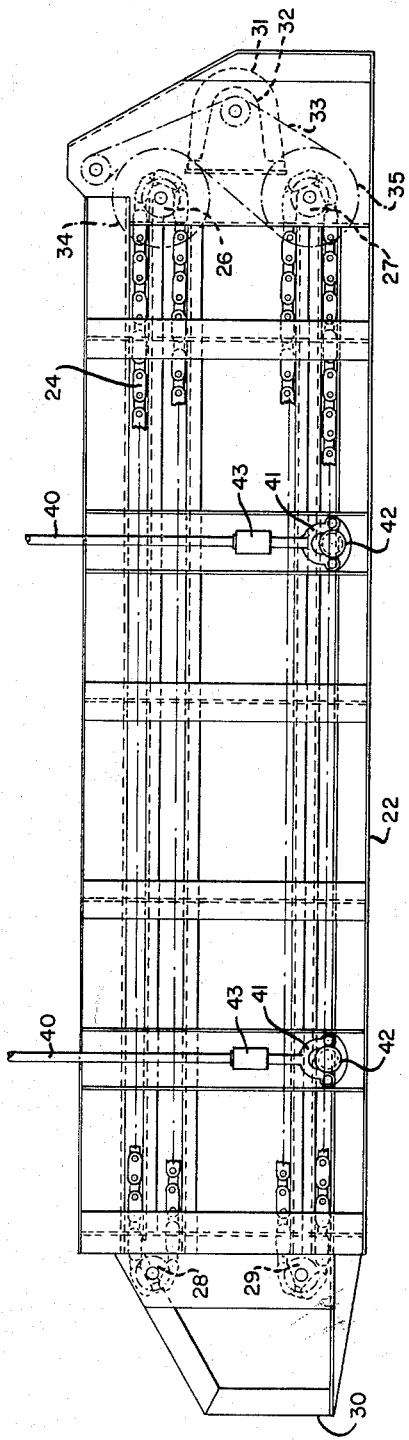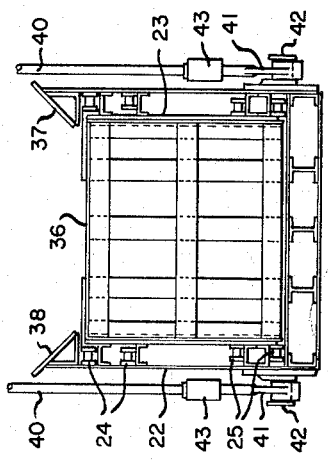

3,179,265
CHARGING MACHINES
Nicholas Evascu, Pittsburgh, Pa., and Milo Shutt, Alliance, Ohio, assignors to The Alliance Machine Company, a corporation of Ohio
Filed Feb. 2, 1962, Ser. No. 170,731
7 Claims. (Cl. 214—18)

This invention relates to charging machines and particularly to a charging machine for converter type steel refining vessels such as the L–D vessel, the Bessemer converter, the Kaldo vessel and the like in which a charge of scrap is fed into top opening of the vessel.

The problem of charging scrap into open top vessels having a small opening as compared with the body of the vessel has long been recognized. It has been the practice to load such vessels from carts or buggies on an elevated charging floor. This practice is slow and expensive and some way of rapidly mechanically loading such furnaces has long been sought.

We have invented a charging machine for vessels of the type described which is capable of rapidly charging the furnace with a continuous charge without need for a multiplicity of buggies and without need for a charging floor on which such buggies might run.

We provide a runway above the vessel to be charged, a bridge span extending between said runways and movable thereon, second runways on said bridge transverse to said first runway, trolley means traversable on said second runways, a charge box adjustably suspended from said trolley at each end whereby the entire box may be raised or either end may independently be raised and feeder means in said box adapted to push the contents of said box toward one end thereof. Preferably the adjustable suspending means are double acting hydraulic rams, one at each corner of the box. In a preferred embodiment we provide third runways on said bridge beneath the second runways and parallel thereto, a carriage on said third runway and loading means on said third runways.

In the foregoing general description we have set out certain purposes, objects and advantages of our invention. Other objects, purposes and advantages of this invention will be apparent from a consideration of the following description and the accompanying drawings in which, FIGURE 1 is a segmental side elevation of a preferred embodiment of our invention;

FIGURE 3 is an enlarged side elevation of the charging box of FIGURE 1; and

FIGURE 4 is an enlarged end elevation from the left of FIGURE 3.

Figure 1:
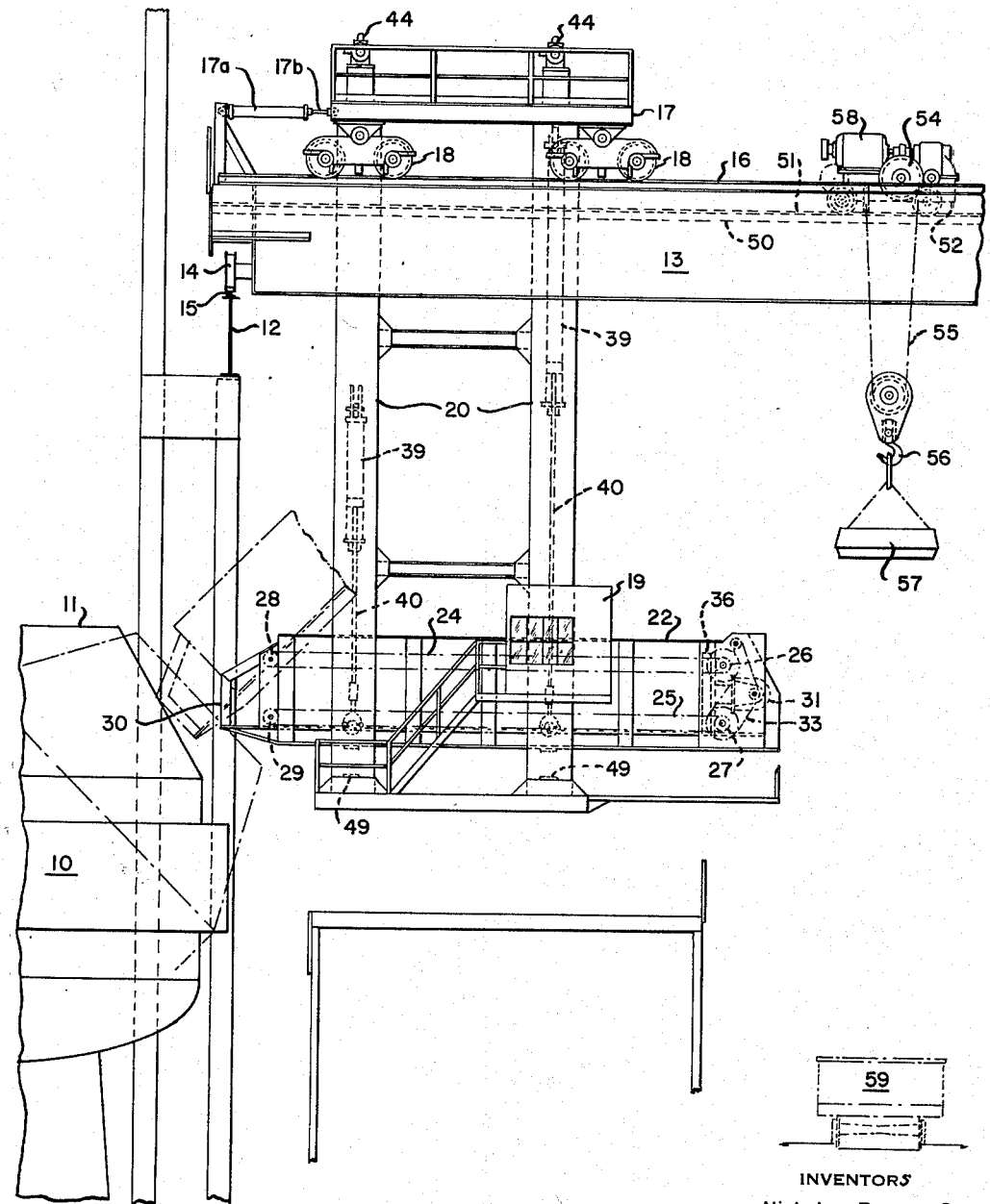
Figure 2:
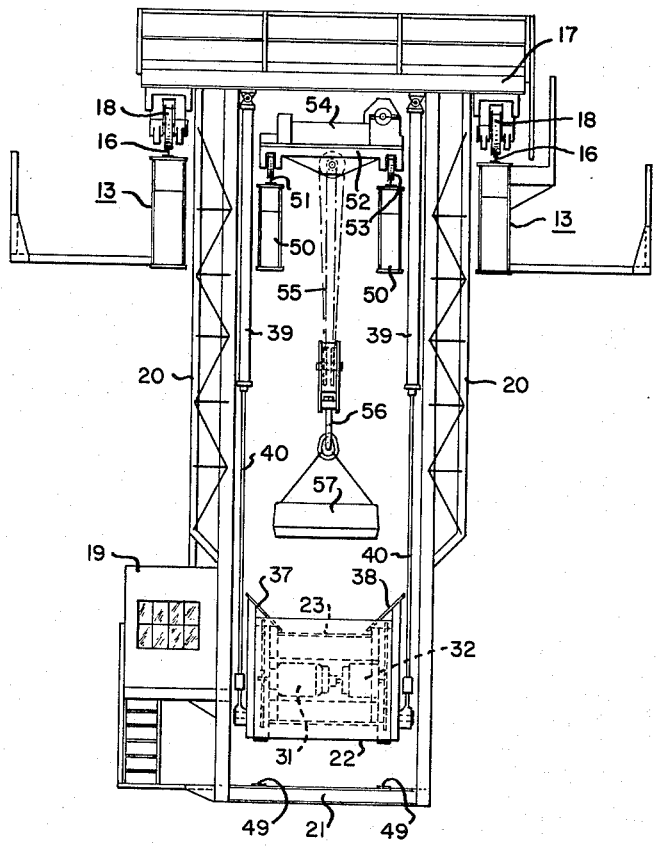
FIGURE 2 is an end elevation from the right of the charging machine of FIGURE 1.

Referring to the drawings, we have illustrated a conventional L–D type of oxygen refining vessel 10 having a top opening 11 and adapted to be tilted for charging from the solid line position to the chain line position of FIGURE 1. A runway 12 is provided above the vessel 10. A moving bridge 13 mounted on wheels 14 is provided to operate on rails 15 on runway 12. The wheels 14 are driven in conventional manner for crane bridges. A runway composed of rails 16 is provided on the parallel beams of bridge 13. A trolley or carriage 17 mounted on wheels 18 is adapted to travel on the rails 16 transverse to runway 12. The wheels 18 may be driven in conventional manner for crane trolleys or the trolley may be operated by a hydraulic cylinder 17a fixed to bridge 16 and piston 17b fixed to the trolley as shown. Suspended from trolley 17 is an operator's cage or box 19 on an outer supporting framework 20 having a base 21. Within the framework 20 is a charging box 22 having an inner box 23 spaced from the outer box 22. Between box 22 and box 23 on either side thereof are paired continuous chains 24 and 25 at top and bottom respectively which pass around drive sprockets 26 and 27 respectively at the rear end of the box and idler sprockets 28 and 29 respectively at the discharge end 30 of the box. The drive sprockets 26 and 27 are simultaneously driven by a motor 31 through a gear reducer 32, a drive chain 33 and driven sprockets 34 and 35. A moving gate 36 is fixed to chains 24 and 25 for movement between the two ends of the charging box whereby scrap loaded in the box may be moved forward to the discharge end 30. Hopper sides 37 and 38 are provided on the inner box 23 to guide scrap into the box. Hydraulic cylinders 39 are suspended from trolley 17 and are provided with lifting pistons 40. The lower ends of pistons 40 are provided with lifting eyes 41 engaging trunnions 42 on the box 22. Load cells 43 are provided on the pistons 40 for weighing the contents of box 22 through conventional circuitry, not shown. Hydraulic pumps 44 on the trolley 17 are actuated by electric motors (not shown) from the cab 19 so as to control the movement of pistons 40 and piston 17b.

An inner bridge 50 is suspended from the main bridge 17 and provided with rails 51 forming a runway carrying a loading trolley 52 on wheels 53 driven by an electric motor in conventional manner. The loading trolley 52 is provided with a cable drum 54 carrying a cable 55 and suspended crane hook 56 with a loading device such as a magnet 57 for handling scrap. The drum 54 is driven by motor 58 on the trolley.

The charging machine of this invention operates as follows: Scrap to be charged is picked from a scrap car 59 on the floor of the shop and lifted by magnet 57 or trolley 52 acting through cables 55 and hook 56. The scrap is carried over the charging box 22 which rests for loading on shock pads 49 on base 21. When the box 23 is loaded the trolley 17 is moved to the left (viewing FIGURE 1) and raised to the proper height for charging in furnace 10 by means of pistons 40. The pistons at the charging end 30 of the box are stopped and the pistons at the rear end of the box are continued to be raised until the box is tilted as partially shown in chain line. The motor 31 is actuated to drive chains 24 and 25 carrying the gate 36 toward the discharge end 30 of the charging box thus feeding the scrap into furnace 10.

It is evident from the foregoing description that a complete charge of scrap may be loaded into box 22 preparatory to charging furnace 10 and that this whole charge may be rapidly fed into the furnace. This eliminates loss of time and the need for many charging boxes or units.

While we have illustrated and described a presently preferred embodiment of our invention it will be understood that this invention may be otherwise embodied within the scope of the following claims.

We claim:

1. In a charging machine for open mouth steel melting vessels and the like, a runway above said vessel, a bridge extending transversely to said runway and movable on said runway, a trolley movable lengthwise of said bridge, vertical guides depending from said bridge forming a depending framework, a charging box suspended between said vertical guides and restricted thereby adjacent its ends and movable therewith, means adjustably suspending said charging box whereby the ends of said box may be independently elevated and means actuating said suspending means.

2. In a charging machine for open mouth steel melting vessels and the like, a runway above said vessel, a bridge extending transversely to said runway and movable on said runway, a trolley movable lengthwise of said bridge, vertical guides depending from said bridge forming a depending framework a charging box suspended between said vertical guides and restricted thereby adjacent its ends and movable therewith, means adjustably suspending said charging box whereby the ends of said box may be independently elevated, means actuating said suspending means, a second runway suspended from said bridge and parallel thereto, a second trolley on said runway and loading means vertically movable on said trolley.

3. In a charging machine for open mouth steel melting vessels and the like, a runway above said vessel, a bridge extending transversely to said runway and movable on said runway, a trolley movable lengthwise of said bridge, vertical guides depending from said bridge forming a depending framework, a charging box vertically adjustably suspended adjacent its ends between said vertical guides and movable therewith, whereby the ends of said box may be independently elevated, a second runway suspended from the bridge, a second trolley on said second runway movable beneath the first trolley, and loading means vertically adjustably suspended from said second trolley and movable from a position above the charging box to a position clear of the charging box.

4. In a charging machine for open mouth steel melting vessels and the like, a runway above said vessel, a bridge extending transversely to said runway and movable on said runway, a trolley movable lengthwise of said bridge, vertical guides depending from said bridge forming a depending framework, hydraulic cylinders depending from said trolley, vertically moving pistons in said cylinders and a charging box suspended adjacent its ends from said pistons and movable therewith between the vertical guides within a restricted vertical path whereby the ends of said box may be independently elevated and means actuating said hydraulic cylinders.

5. In a charging machine for open mouth steel melting vessels and the like, a runway above said vessel, a bridge extending transversely to said runway and movable on said runway, a trolley movable lengthwise of said bridge, vertical guides depending from said bridge forming a depending framework, paired hydraulic cylinders depending from said trolley, vertically moving pistons in said cylinders, a charging box suspended adjacent its ends from said pistons and movable therewith between the vertical guides and restricted thereby whereby the ends of said box may be independently elevated, a second runway suspended from said bridge between the paired pistons and parallel to said bridge, a second trolley on said second runway and movable thereby, a cable drum and drive on said trolley, cable means depending from said drum and loading means on said cable.

6. In a charging machine for open mouth steel melting vessels and the like, a runway above said vessel, a bridge extending transversely to said runway and movable on said runway, a trolley movable lengthwise of said bridge, vertical guides depending from said bridge forming a depending framework, an hydraulically extensible member on the bridge selectively moving said trolley, a charging box suspended adjacent its ends from said trolley on hydraulically extensible members and movable therewith between the vertical guides and restricted thereby whereby the ends of said box may be independently elevated and transfer means in the charging box moving selectively from one end to the other.

7. In a charging machine for open mouth steel melting vessels and the like, a runway above said vessel, a bridge extending transversely to said runway and movable on said runway, a trolley movable lengthwise of said bridge, vertical guides depending from said bridge forming a depending framework, a charging box suspended adjacent its ends from said trolley on hydraulically extensible members and movable therewith between the vertical guides for movement in a restricted vertical path whereby the ends of said box may be independently elevated and a transfer gate in the charging box movable from one end to the other and chain drive means moving said gate.

References Cited by the Examiner
UNITED STATES PATENTS

| 1,332,168 | 2/20 | Dickinson | 214—152 |
| 1,363,442 | 12/20 | Swern | 212—126 |
| 1,964,621 | 6/34 | Creasy et al. | 214—29 X |
| 2,541,866 | 2/51 | Gamble et al. | 214—26 |
| 2,828,874 | 4/58 | Calderon | 214—26 X |

HUGO O. SCHULZ, Primary Examiner.
ERNEST A. FALLER, JR., Examiner.